March 26, 1929. A. W. NORDGREN 1,706,806
BUMPER AND BUMPER SUPPORT
Filed March 28, 1928 2 Sheets-Sheet 2
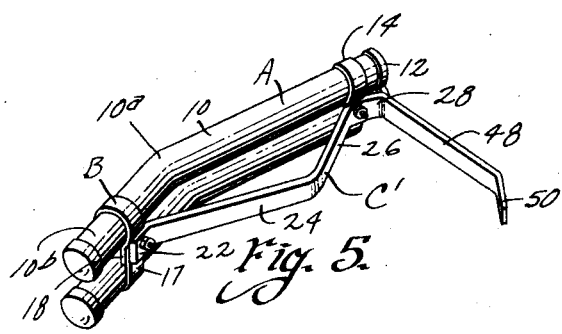
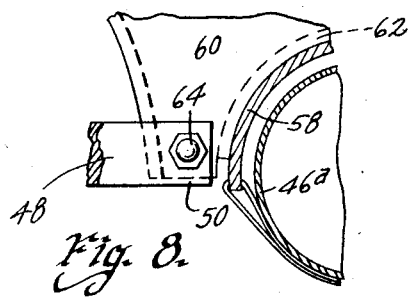
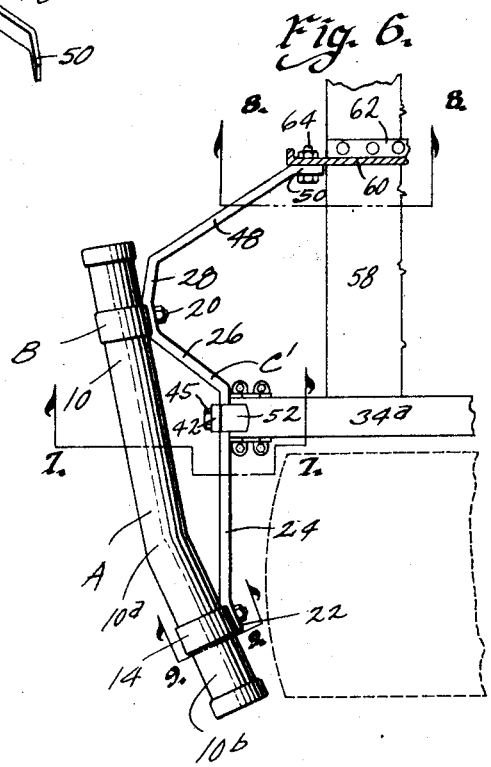
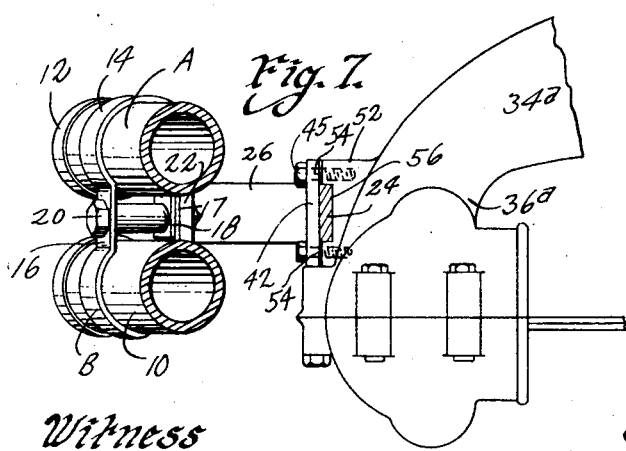
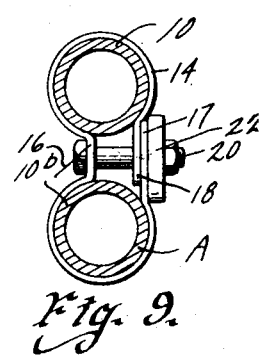
Inventor
A. W. Nordgren
by Bair & Freeman Attorneys Patented Mar. 26, 1929.

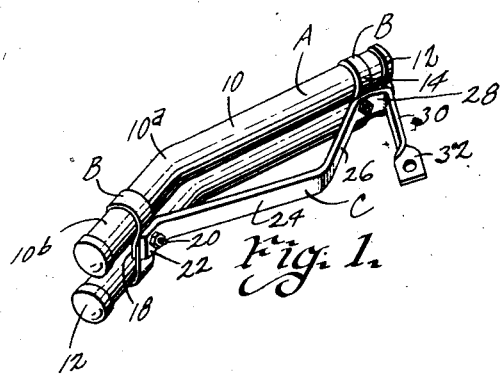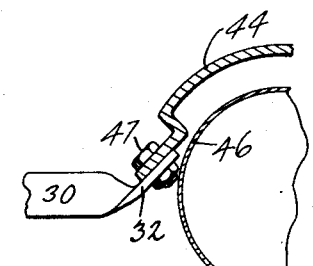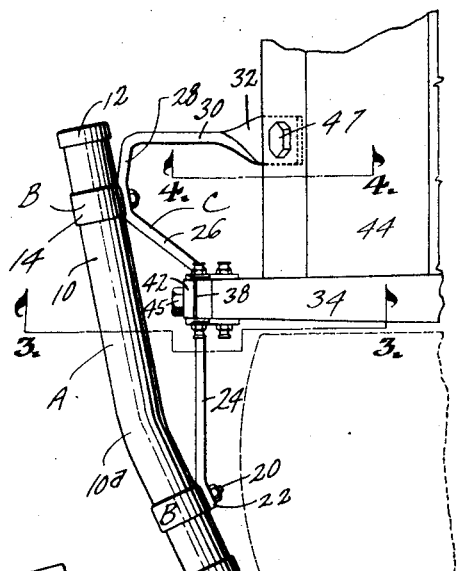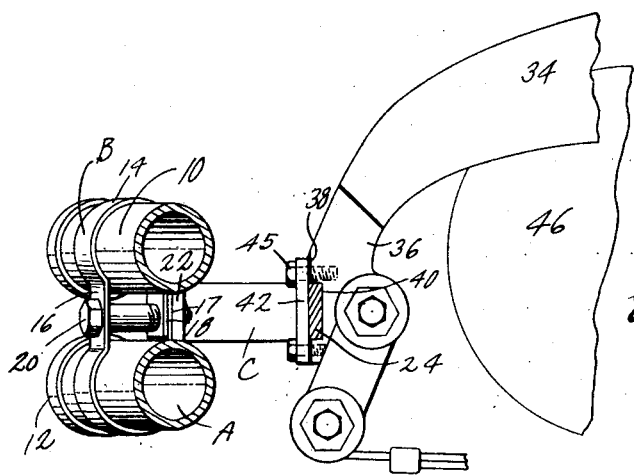

1,706,806

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER AND BUMPER SUPPORT.

Application filed March 28, 1928. Serial No. 265,298.

My present invention has to do with a bumper and bumper support of peculiar structure, whereby there is provided a bumper of the "bumperette" type having a strong, rigid support, which can be conveniently manufactured in the factory, so as to permit the sale and shipment of the assembled bumper and bumper support.

Furthermore, the bumper support has certain novel features, which permit its quick, convenient and easy mounting on automobiles of certain kinds for securing a maximum of rigidity and for insuring such strength in the support and bumper as to afford to the fenders and car parts efficient protection.

With these and other objects in view, my invention consists in the construction, arrangement and combination of the various parts of my bumper and bumper support, whereby the objects contemplated are attained, as hereinafter more fully set forth, pointed out in my claims, and illustrated in the accompanying drawings, in which:

Figure 1 is a perspective view of a bumper and bumper support embodying my invention, assembled as ready to be shipped from the factory.

Figure 2 is a top or plan view of a portion of the rear end of an automobile equipped with a bumper and bumper support embodying my invention.

Figure 3 is a detail, sectional view taken on the line 3—3 of Figure 2.

Figure 4 is a similar view taken on the line 4—4 of Figure 2.

Figure 5 is a perspective view of a slightly modified form of my bumper and bumper support.

Figure 6 is a view similar to that of Figure 2, illustrating the manner of assembling the device shown in Figure 5 on a different car from that shown in Figure 2.

Figure 7 is a detail, sectional view taken on the line 7—7 of Figure 6.

Figure 8 is a detail, sectional view taken on the line 8—8 of Figure 6; and

Figure 9 is a detail, sectional view taken on the line 9—9 of Figure 6.

For convenience, I have in Figures 1 to 3 inclusive shown a bumper and bumper support as constructed for and installed on a Graham-Paige automobile, while in Figures 5 to 8 inclusive. I have shown the device as installed on a Chrysler car.

My present device consists of a bumper proper, a supporting means therefor, and incidentally of means for conveniently connecting the supporting means to the bumper.

The bumper proper consists of a pair of tubular members indicated generally by the reference numeral 10, the members of the pair being arranged in vertically spaced, parallel relation, as shown in Figure 1.

The bumper members 10 are of proper length for the car upon which they are to be installed, but generally speaking they extend from points about in line with the outer edge of the fenders laterally and inwardly to overlap the back portion of the car body (see for instance Figure 2).

I find it desirable to slightly bend each bumper member 10, as at $10^a$, at a point nearer one end than the other, so that the outer portion $10^b$ of each bumper member 10 is inclined at an obtuse angle with relation to the main body thereof.

The portion $10^b$ is designed to be adjacent to the fender of a car when the bumper is installed on the car, and the inclination thereof with relation to the main body of the bumper 10 is for the purpose of bringing the portion $10^b$ a little closer to the bumper for thus affording better protection.

For appearance sake, and also to prevent rust at the ends of the members 10 and to close these members, so that they will not be so likely to catch obstructions, I provide each end of each bumper member 10 with a cap 12.

Near the respective ends of the bumper members 10, I provide clamping devices for connecting the bumpers 10 with the support hereinafter more fully described.

For convenience, I have given to the bumper proper the reference character A, to the clamp members by which the bumper members 10 are secured to the support the reference character B, and to the support itself the reference character C.

Each clamp B comprises broken ring members or straps 14 integrally connected on one side as at 16 and having overlapping ends as at 17 and 18. A bolt 20 extends through the connecting portion 16 and through the overlapping ends 17 and 18 and serves to connect together the members 17 and 18 and to fasten them to the support C.

The support C is preferably made of a single piece of heavy strap or bar iron. It consists of a short, horizontal portion 22 through which one of the bolts 20 is extended. The portion 22 fits snugly against one of the members 17. From the portion 22, a portion 24 is inclined away from the bumper members 10 (see Figures 1 and 2) at such an angle that when the device is to be installed on a car, the portion 24 may be placed in horizontal position at right angles to the longitudinal axis of the car, and thereupon the bumper 10 will be inclined from its outer end inwardly and rearwardly as shown in Figure 2. From that end of the portion 24 farthest from the members 10, a portion 26 is inclined toward the members 10, and the other clamp device B, and terminates in a short portion 28 parallel with the other portion 17 (see Figure 1).

From the portion 28, a portion 30 extends away from the bumper 10 almost at right angles thereto, as shown in Figures 1 and 2, so that when the device is placed adjacent the rear end of the car, the portion 30 extends toward the car.

At what would then be the forward end of the portion 30, the material is twisted, so that the extreme forward end of the portion 30 forms a portion 32 inclined upwardly and forwardly.

I will now refer to the manner of installing the bumper and bumper support above described upon a car, such for instance as a Graham-Paige.

Such a car has the longitudinal, side frame members 34 terminating in downwardly inclined horns 36 at their rear ends. The rear portion of the horn 36 is provided with a flat face 38 in which is a transverse slot 40. A part of the member 24 is inserted into the slot 40 and a plate 42 is placed over the slot and secured to the horn by means of bolts 45. The depth of the slot 40 is slightly less than the thickness of the member 24, so that the plate 42 tightly clamps the member 24 in place.

The car is provided with a sheet metal member 44, which covers the gasoline tank 46.

The member 32 is inclined upwardly slightly and secured by means of the bolt 47 to the lower, rear part of the member 44, as shown in Figures 2 and 4.

The members 24 and 26 thus form a truss for resisting impacts against the bumper, and the members 30, and 32 and 28 form a strong supporting brace, whereby the bumper is supported at a point substantially spaced from the horn 36, and a satisfactory, rigid support is provided.

In Figures 5 to 8, I have shown a slightly different form of my bumper and bumper support.

The bumper structure A and the clamp members B are the same as have already been described. The bumper support of the modified form, I have indicated by the reference character C'. It has the portions 22, 24, 26 and 28, similar to those already described.

Extending from the portion 28 is a member 48 projecting forwardly when the device is in position for installation, and terminating in an inclined end 50.

The bumper and bumper support shown in Figures 5 to 8 are intended to be mounted on a car as shown in Figures 6 and 7. The car is provided with the frame member 34$^a$, similar to the frame member 34 in general structure, having the horn 36$^a$, which has a rearwardly projecting lug 52, with a flat, rear face 54, in which is a transverse recess 56 similar to the recess 40.

The member 24 is placed in the recess 56 and fastened in position by means of a plate 42 similar to that already described, with bolts 45.

The Chrysler car has a member 58 forming a protecting shield for the gas tank. It also has a tire carrier provided with a horizontal member 60 having a flange 62 riveted to the member 58.

The inclined portion 50 is secured to the flange 62 by means of a bolt 64.

The general structure involved in the two forms of bumper support is the same.

I claim as my invention:

1. A bumper, clamping devices on the bumper at spaced points thereon, a bumper support comprising a member having portions secured to the clamping devices and portions intermediate said first-named portions and inclined at an obtuse angle to each other for forming a truss-like structure, said member being provided at one end with a forwardly projecting portion terminating in a part bent at an angle to said forward projecting portion, and means for securing said last-described part to a vehicle.

2. In a device of the class described, the combination of a bumper having a portion bent at an obtuse angle to its main portion, clamping devices on said bumper portions, a support having one end secured to one of said clamping devices and inclined therefrom away from the bumper, and another portion inclined from said last portion toward the bumper and secured to the other clamping device, and a portion inclined away from said last portion forwardly and terminating in an inclined end, said first and last-named portions being adapted to be rigidly secured at spaced points to a car body.

3. In a device of the class described, a bumper, a support therefor, comprising a truss-like part inclined from an intermediate point toward the opposite ends of the bumper and secured to the bumper near its opposite ends, one end of said support being provided with a member projecting forward from the bumper and adapted to be secured to a car body, and means for securing the truss-like portion to a car body.

4. In a device of the class described, a bumper, means thereon for fastening a support thereto arranged near the respective ends of the bumper, a support comprising an end portion secured to one of said means, a portion extending away from said end portion at an angle to the bumper, a portion extending from said last-described portion toward and to the bumper and secured to the other of said fastening means, and a portion inclining forward from the bumper and terminating in an inclined end, and means for securing said second portion and said inclined end to spaced parts of a car body.

5. In a device of the class described, a pair of vertically spaced, parallel bumper members, clamping devices for securing said bumpers together in their spaced relation arranged near the ends of the bumper, a support having portions secured to said clamping devices, and intermediate portions inclined away from the clamping devices and away from the bumper to form a truss-like structure, means for fastening one of said last-named portions to a car body, said support having at one end a portion extending forward and adapted to be secured to a car body.

6. The combination of a vehicle structure having a projecting member provided with a transverse groove and a projecting element spaced therefrom, with a bumper and a bumper support secured to the bumper near the ends thereof and forming with relation to the bumper a truss having a part received in said groove and secured therein, said support having a portion extending forward from one end of the bumper and secured to said element.

7. In a device of the class described, a bumper support having a truss-like portion adapted to be secured between its ends to a car and at its ends to a bumper, and having at one end a portion projecting beyond the forward portion of the truss-like portion and adapted to be secured to a different part of a car.

8. In a device of the class described, the combination of a bumper with a support having a portion secured to the bumper, a second portion inclined away from the first portion at an obtuse angle, a third portion inclined away from the second portion, and forming therewith a truss-like element, a fourth portion inclined from the third portion and secured to the bumper, a fifth portion inclined from the fourth portion away from the bumper, spaced laterally from the truss-like element and terminating in an inclined end.

Des Moines, Iowa, March 20, 1928.

ALGOT W. NORDGREN.